June 24, 1969    A. B. HAWES    3,451,351
MONORAIL SWITCHING SYSTEM
Filed June 14, 1968    Sheet 3 of 3
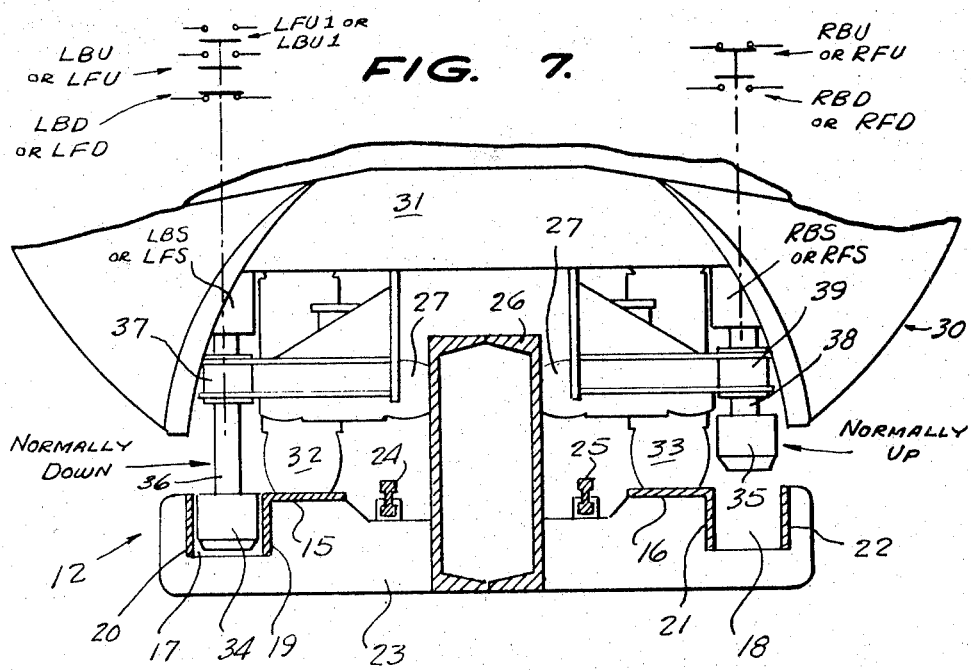
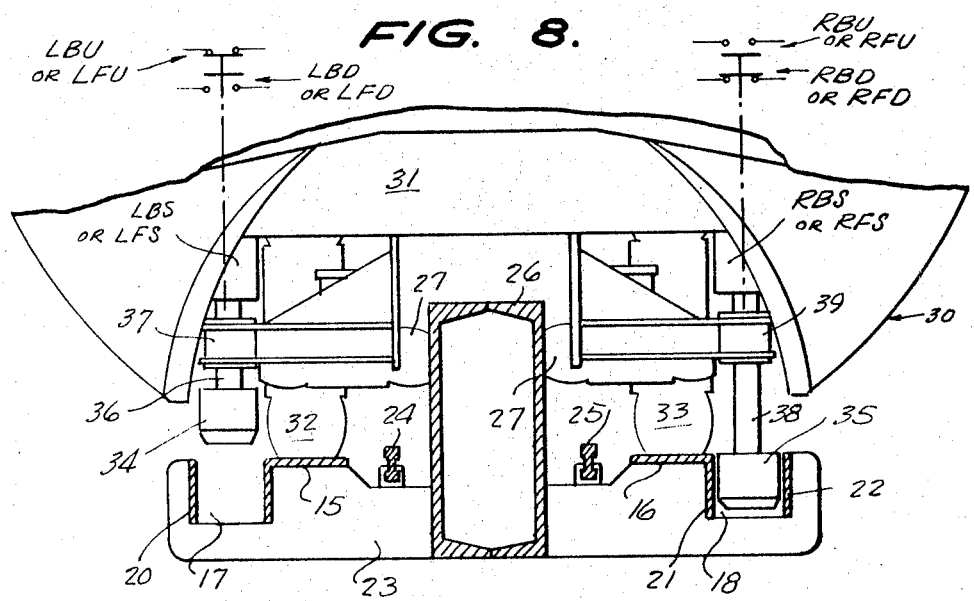
INVENTOR.
ALAN B. HAWES,
BY
Berman, Bardeen & Berman
ATTORNEYS.

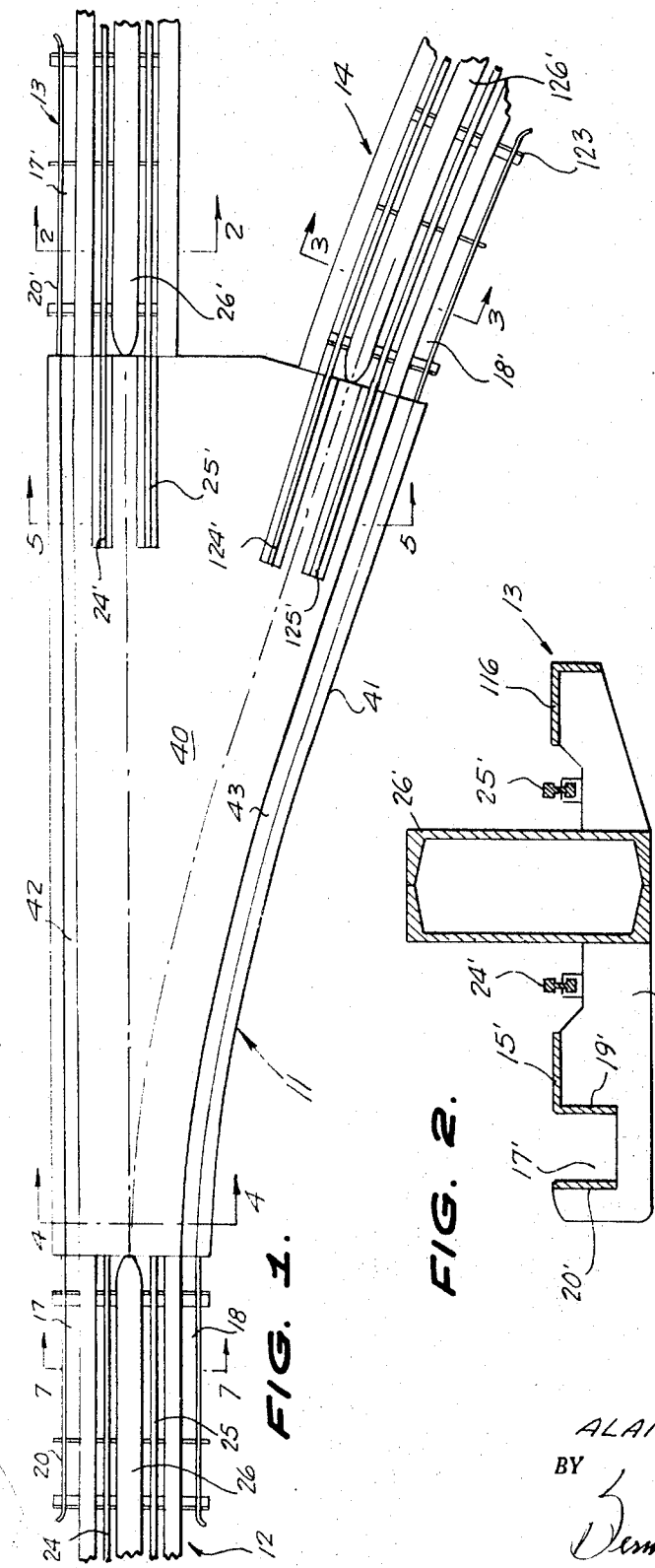
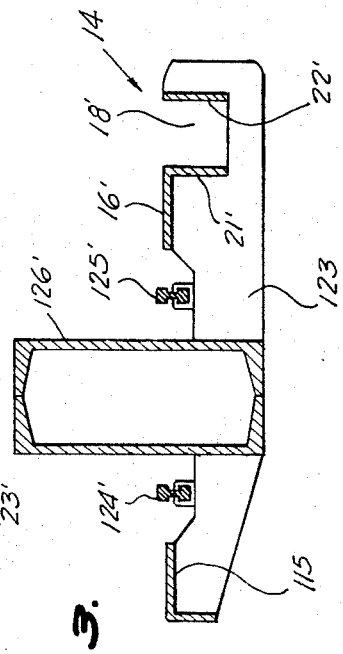

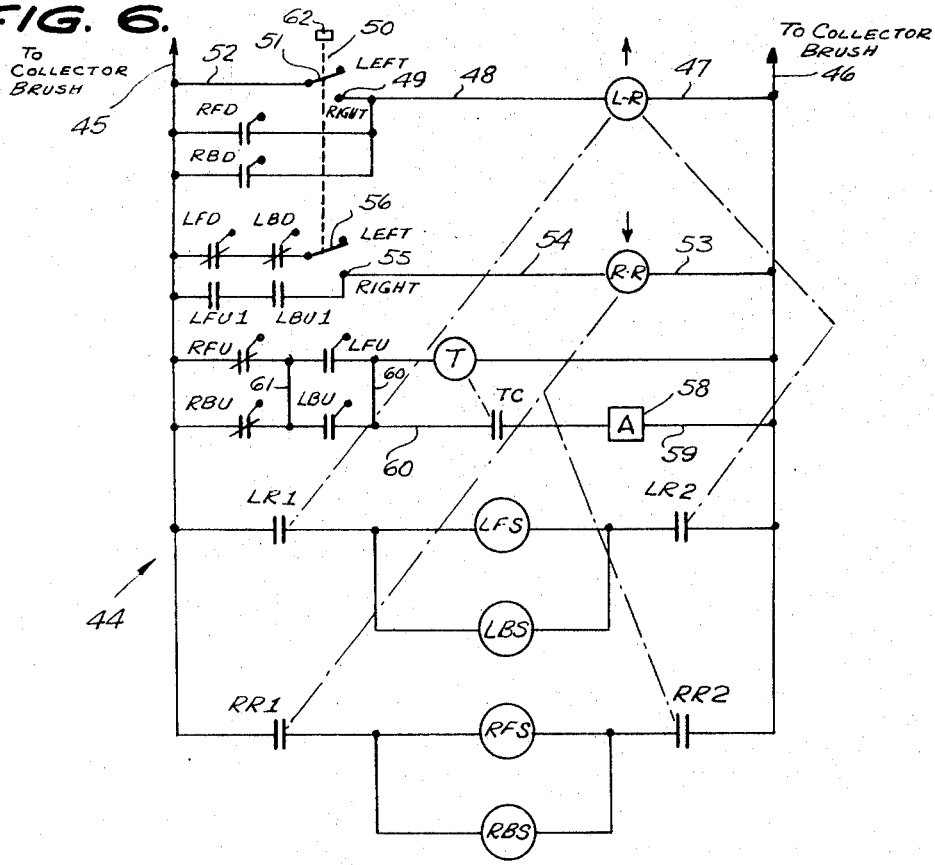

United States Patent Office 3,451,351
Patented June 24, 1969

3,451,351
MONORAIL SWITCHING SYSTEM
Alan B. Hawes, 8504 Seaview Ave.,
Wildwood Crest, N.J. 08260
Filed June 14, 1968, Ser. No. 737,089
Int. Cl. E01b 25/06, 25/12, 25/20
U.S. Cl. 104—130
10 Claims

ABSTRACT OF THE DISCLOSURE

A switching assembly for a monorail car. The car has respective right and left vertically-journaled guide rollers which are vertically-reciprocable by means of solenoids. The rollers are engageable in respective trackway grooves. The solenoids are energized selectively by a circuit including a timed alarm device to indicate malfunction, such as failure to lower at least one guide roller. The circuit for the alarm device includes branches containing roller elevation-responsive limit switches controlled by the raising of the guide rollers. The circuit also includes branches for controlling the energization of the solenoids containing roller descent-responsive limit switches controlled by the lowering of the guide rollers. The solenoid-energizing circuits are interlocked by their limit switches so as to permit the solenoids for the right side to be energized only when the rollers of the left side are in lowered position. The solenoids for the left side can be energized independently of the limit switches associated with the right side, but are held energized by the last-named limit switches after the rollers at the right side have been lowered.

---

This invention relates to monorail systems, and more particularly to switching systems for monorail cars.

A main object of the invention is to provide a novel and improved switching system for monorail cars wherein the system includes a trackway having car-guiding grooves and wherein the cars have vertically-reciprocable guide rollers engageable in such grooves and being selectively operable so that the car may be, at times, guided onto a branch rail or spur of the system, the improved system involving relatively simple components, being reliable in operation, and being designed so that any serious malfunction of its components will not cause any damage to the system.

A further object of the invention is to provide an improved monorail system of the type having a trackway provided with guide grooves and wherein the cars have vertically-reciprocable guide rollers engageable in such grooves, the system being so arranged that it may be operated either manually or by automatic programming with signals originating from a central control station or from any other desirable location.

A still further object of the invention is to provide an improved monorail switching system of the type wherein the monorail cars employ vertically-reciprocable guide rollers which are engageable in guide grooves provided on the monorail track structure, the system being arranged to allow only the guide rollers on one side of a monorail car to be in lowered position at any one time, even under conditions of power failure, mechanical malfunction, or operator error.

Further objects and advantages of the invention will become apparent from the following description and claims, and from the accompanying drawings, wherein:

FIGURE 1 is a top plan view of a portion of a monorail trackway according to the present invention including a switching section which connects a branch track or spur to the main track of the system.

FIGURE 2 is an enlarged transverse vertical cross-sectional view taken substantially on the line 2—2 of FIGURE 1.

FIGURE 3 is an enlarged transverse vertical cross-sectional view taken substantially on the line 3—3 of FIGURE 1.

FIGURE 4 is an enlarged transverse vertical cross-sectional view taken substantially on the line 4—4 of FIGURE 1.

FIGURE 5 is an enlarged transverse vertical cross-sectional view taken substantially on the line 5—5 of FIGURE 1.

FIGURE 6 is an electrical wiring diagram showing in schematic form the electrical connections of the components of the control circuit of a monorail car forming part of the system of the present invention, shown with the elements thereof in normal conditions.

FIGURE 7 is an enlarged transverse vertical cross-sectional view taken substantially on the line 7—7 of FIGURE 1 with a portion of a monorail car supported on the trackway, shown with its guide rollers in normal positions, namely, arranged for movement of the associated car straight ahead on the main track of the system.

FIGURE 8 is a transverse vertical cross-sectional view similar to FIGURE 7, but showing the guide rollers of the car in reversed positions, namely, set to guide the associated monorail car onto the spur track of FIGURE 1.

Referring to the drawings, and more particularly to FIGURE 1, 11 generally designates a switch portion of a monorail track system according to the present invention. The switch portion 11 connects a main trackway section 12 to the junction of an extension 13 of the main trackway and a spur trackway 14. As will be seen from FIGURE 7, the main trackway section 12 comprises respective left and right wheel-supporting rails 15 and 16 adjacent to which are provided respective left and right guide channels 17 and 18. Thus, the guide channel 17 is defined by a depending vertical flange 19 provided on the supporting track 15 and by the outwardly-spaced guide plate 20. Similarly, the right guide channel 18 is defined by a depending flange 21 on the supporting track element 16 and the outwardly-spaced guide plate element 22. The tracks 15 and 16 and the guide plate elements 20 and 22 are secured to suitable crossties 23 to form a rigid unitary assembly. Also supported on the crossties 23 and suitably insulated therefrom are respective current-supply rails 24 and 25 adapted to be engaged by suitable contact brushes carried by the monorail vehicles traveling on the trackway system. The trackway system is also provided with a central guide rail 26 rising a substantial distance above the level of the supporting rail elements 15 and 16 and being adapted to be engaged by respective left and right horizontal guide rollers 27 carried on a monorail car traveling over the trackway system.

As shown in FIGURE 2, the extension 13 of the main trackway portion of the system is likewise provided with the upstanding central guide rail 26'. The extension 13 of the main trackway also has a guide groove or channel 17' defined between the depending flanges 19' of the left track 15' and the vertical plate element 20' which is in alignment with the previously-mentioned longitudinally-extending vertical plate element 20 and which is similar thereto. Likewise, the guide rail 26' is longitudinally-aligned with and similar to the previously-mentioned central guide rail 26. Also provided on the extension 13 are current-supply rails 24' and 25' which are in alignment with the previously-described current-supply rails 24 and 25. Rails 24' and 25' are insulated from the adjacent track structure in the same manner as the rails 24 and 25.

The spur track section 14 is generally similar in construction to the main track extension 13 except that it is reversed in structure. Thus, as shown in FIGURE 3, the spur track section has a guide channel 18' defined between the depending flange 21' of the right supporting track 16' and a longitudinally-extending vertical plate element 22'. The spur track section 14 is likewise provided with the upstanding central guide rail 126' and with the current-supply rails 124' and 125'.

As shown in FIGURE 2, the main track extension 13 is provided with a normal wheel-supporting rail 116 aligned with the wheel-supporting rail 16 of main track section 12. The spur track section 14 is similarly provided with a normal wheel-supporting rail 115 at the left side of the guide rail 126', as shown in FIGURE 3. The elements of main track extension section 13 are secured to crossties 23', and similarly, the elements of the spur track section 14 are secured to corresponding crossties 123.

Referring now to FIGURES 7 and 8, 30 generally designates a monorail car adapted to travel on the rail system above-described. The monorail car 30 includes a frame 31 provided with vertical supporting wheels 32 and 33 at the left and right sides of the car adapted to be engaged, respectively, on the supporting rails 15 and 16, as well as being provided with the horizontal guide wheels 27 engageable with the opposite sidewalls of the upstanding central guide rail 26. The car 30 is further provided with back and front guide rollers at its opposite sides which are journaled vertically and which are engageable, at times, in the guide channels at the opposite sides of the trackway system. Thus, the car 30 is provided with the left guide rollers 34 which are receivable in the guide channel 17 at the left side of the main track section 12, as shown in FIGURE 7. The car 30 is likewise provided with front and back guide rollers 35 which are engageable in the guide channel 18 at the right side of track section 12, as shown in FIGURE 8. Under normal conditions, as will be presently explained, the pair of guide rollers 34 at the left side of car 30 are in lowered positions, namely, as shown in FIGURE 7, whereas, under normal conditions, the right guide rollers 35 are in elevated positions.

The left guide rollers 34 are journaled on vertical shafts 36 which are vertically-reciprocable in bearing assemblies 37 and which are raised responsive to the energization of solenoid assemblies LBS and LFS. Shafts 36 are biased downwardly by suitable spring-biasing means, not shown.

The rollers 35 at the right side of car 30 are carried on vertical shafts 38 extending through and slidably-engaged with bearing assemblies 39 carried by frame 31 and are reciprocated downwardly responsive to the energization of solenoid assemblies RBS and RFS, the shafts 38 being biased upwardly by suitable spring means, not shown. Thus, under normal conditions, the left rollers 34 are in lowered positions and the right rollers 35 are in raised positions, as shown in FIGURE 7. When the solenoids LBS and LFS are energized, the rollers 34 are elevated, and when the solenoid assemblies RBS and RFS are energized, the right guide rollers 35 are in lowered positions, as illustrated in FIGURE 8.

The main track section 12 merges with the main track extension section 13 and the spur track section 14 through a track joint section 40 comprising a flat main supporting body 41 which is of generally triangular shape, as shown in FIGURE 1, and which is provided with the left guide groove 42 registering with guide channels 17 and 17', and with a right guide groove 43 registering with the channels 18 and 18'.

As shown in FIGURE 5, the current-supply rails 24', 25' and 124', 125' overlap the right end of the body 41 by a sufficient distance to allow the current-supply shoes of a monorail car to engage on these current-supply rails before the rear current-supply shoes of the monorail car disengage from the current-supply rails 24 and 25 of the main track section 12.

In a typical embodiment of the invention, each bar 30 will be provided with two guide rollers 34 at its left side, and two guide rollers 35 at its right side, one of the guide rollers at each side being located near the front of the car, and the other guide roller at said side being located near the rear of the car. Suitable limit switches are mounted above each of the guide roller shafts 36 and 38 and are operated in a conventional manner by said shafts responsive to the vertical reciprocation of the shafts. Thus, the left shafts close respective limit switches LBU and LFU responsive to the raising of the shafts 36, namely, responsive to the energization of the solenoid assemblies LBS and LFS. These shafts also close other limit switches LBD and LFD when they are in their normal lowered positions, as shown in FIGURE 7.

Similarly, suitable limit switches of conventional construction are provided at the right side of the car, controlled by the positions of the shafts 38. When the shafts 38 are in raised positions, as shown in FIGURE 7, they close respective limit switches RBU and RFU. When the shafts 38 are lowered, responsive to the energization of the solenoid assemblies RBS and RFS they close respective limit switches RBD and RFD. Normally, as shown in FIGURE 7, the limit switches RBU and RFU are closed and the limit switches RBD, RFD are opened. When the solenoid assemblies RBS and RFS are energized, producing the condition illustrated in FIGURE 8, the limit switches RBD and RFD close and the limit switches RBU and RFU open.

Each car 30 is provided with a control circuit similar to that designated generally at 44 in FIGURE 6. The control circuit 44 comprises a pair of power-supply wires 45 and 46. The solenoid assemblies LFS and LBS are connected in parallel and their parallel circuit is connected through the respective sets of contacts LR1 and LR2 of a relay LR to the line wires 45 and 46. The solenoid assemblies RFS and RBS are connected in parallel and their parallel circuit is connected through the respective sets of contacts RR1 and RR2 of a relay RR to the line wires 45 and 46. Thus, the left front and left back solenoid assemblies LFS and LBS are simultaneously energized responsive to the energization of the relay LR, and the right front and back solenoid assemblies RFS and RBS are simultaneously energized responsive to the energization of the relay RR.

One terminal of the winding of the relay LR is connected by a wire 47 to the line wire 46 and the other terminal of the winding of the relay LR is connected by a wire 48 to a contact 49 of one section of a double-pole, double-throw switch assembly 50. Contact 49 is engageable by the pole 51 of said section responsive to the actuation of the switch from its "left" position to its "right" position. Pole 51 is connected by a wire 52 to the line wire 45. The limit switches RFD and RBD are connected between line wire 45 and the wire 48, as shown.

One terminal of the winding of the relay RR is connected by a wire 53 to the line wire 46 and the other terminal of the winding of said relay is connected by a wire 54 to a stationary contact 55 of the second section of switch 50, being engageable by the pole 56 of said section when the switch 50 is actuated from its "left" position to its "right" position. Pole 56 is connected through the limit switches LBD and LFD to the line wire 45.

Designated generally at 58 is a suitable emergency condition device, which may be either an alarm bell, horn, or whistle, or a suitable circuit breaker to disconnect the driving motors of the car from the supply lines 45 and 46, or a combination of both. One terminal of the operating winding of the device 58 is connected by a wire 59 to line wire 46 and the other terminal thereof is connected through the contacts TC of a timed switch device T to a wire 60. Wire 60 is connected through the limit switches LBU and RBU to the line wire 45 and is also connected to said line wire through the limit switches LFU and RFU.

As shown in FIGURE 6, the common junctions of the limit switches RFU and LFU are connected by a wire 61 to the common junctions of the limit switches RBU and LBU. The timed switch device is connected between the wire 60 and the line wire 46, so that the switch device T becomes energized responsive to the closure of either limit switch RFU or RBU simultaneously with the closure of either limit switch LFU or LBU. The contacts TC are normally open, but close responsive to the continued energization of the timed switch device T for a predetermined period of time. When the contacts TC close, the device 68 becomes energized through these contacts and the simultaneously closed combination of limit switches above-mentioned, namely, the simultaneous closure of either limit switch RFU or RBU, taken with limit switch LFU or LBU.

As shown in FIGURE 6, the poles 51 and 56 are normally in their elevated positions, namely, their "left" positions. The switch 50 may be either manually-operated, as by the provision of a switch-actuating button 62, or by any other suitable control means, such as an automatic programming device which may operate in response to signals originating from a central control station or which may be programmed by a device located on the associated monorail car, or train.

In operation, assuming the car 30 is traveling to the right, as viewed in FIGURE 1, from the region adjacent the main track section 12, and it is desired to steer the car to the right, namely, to cause the car to move onto the spur track section 14 after passing over the switching section 40, the control switch device 50 is actuated to move it from its normal "left" position to its "right" position, moving the poles 51 and 56 downwardly from their positions of FIGURE 6 into engagement, respectively, with the contacts 49 and 55. This energizes the relay LR, closing its contacts LR1 and LR2, and thereby energizing the left solenoid assemblies LFS and LBS located respectively at the front left and the rear left portions of the car. This elevates the roller shafts 36 and disengages the rollers 34 from the channels 17. At the same time, the relay RR is energized, closing its contacts RR1 and RR2, thereby energizing the right solenoid assemblies RFS and RBS. This lowers the shafts 39, moving the rollers 35 at the right side of the vehicle into the right guide channel 18, which thus causes the rollers 35 to enter the guide channel 43 of the switching section 40 and subsequently to enter the guide channel 18' of the spur track section 14, thus causing the car 30 to move onto the spur track action.

As above-mentioned, the car is provided with suitable front and rear contact brushes, the brushes being arranged so that the front brushes will engage the current-supply rails 125' and 124' before the rear contact brushes leave the current-supply rails 25 and 24 as the car moves onto the switching section 40.

Similarly, if the system is set for "right" rail section operation and it is desired to switch the car leftward in a situation employing a switching section reversed from that shown in FIGURE 1, or in any other similar situation, the switch device 50 is actuated from the "right" position to the "left" position of FIGURE 6, elevating the poles 51 and 56 and disengaging them from their contacts 49 and 55. This de-energizes the relay RR and thus, de-energizes the solenoid assemblies RFS and RBS, causing the rollers 35 to be elevated to their normal raised positions. The opening of the limit switches RFD and RBD, previously closed by the lowering of the right roller shafts 38, and disengagement of pole 51 from contact 49 causes the de-energization of the relay LR, thereby opening its contacts LR1 and LR2, de-energizing the solenoid assemblies LFS and LBS. This releases the shafts 36 and allows them to descend, moving their rollers 34 downwardly into positions wherein they can be received in the guide channel 17. This restores the normal conditions shown in FIGURE 7.

The circuit above-described provides important safety interlocking features, some of which will now be described.

Thus, if either or both of the right guide rollers 35 are locked in lowered positions after the switch device 50 has been operated to its "left" position, the relay LR will remain energized by the continued closure of either limit switch RFD or RBD. This keeps the left rollers 34 elevated. Thus, this prevents the simultaneous lowering of both sets of guide rollers 34 and 35.

If both rollers, or one roller of each of the sets of rollers at the respective sides of the car are in their elevated positions, the timed switch device T will be energized by the closure of a series combination of limit switches LFU, LBU, RFU, and RBU. Thus, if one of the limit switches LFU or LBU is closed simultaneously with the closure of one of the limit switches RFU or RBU, the wire 60 will be connected to the line wire 45, energizing the timed switch device T. After a predetermined time period, the contacts TC close and operate the alarm device 58, notifying the operator of the abnormal conditions, and where the device 58 is a circuit breaker, or the like, it de-energizes the motors of the train before it can enter the switching section.

Additional limit switches LFU1 and LBU1 are connected in series between switch contact 55 and line wire 45, these limit switches being normally open, and closing responsive to the elevation of the left rollers 34. The closure of both of these limit switches is necessary in order to maintain the relay RR energized after the switch device 50 has been operated to its "right" position, causing the solenoid assemblies RFS and RBS to become energized and lower the roller shafts 38 at the right side of the car.

While a specific embodiment of an improved monorail car switching system has been disclosed in the foregoing description it will be understood that various modifications within the spirit of the invention may occur to those skilled in the art.

What is claimed is:

1. In combination, a monorail track having right and left guide grooves, a monorail car supported on said track and having respective vertically-reciprocable right and left guide rollers engageable in said guide grooves, one roller being normally down and the other roller being normally up, means to simultaneously raise one roller and lower the other roller and vice versa, and means to lock said one roller in raised position as long as the other roller is in lowered position.

2. The monorail track and car combination of claim 1, and wherein the rollers are provided with respective operating solenoids for raising and lowering them.

3. The monorail track and car combination of claim 2, and an energizing circuit means connected to each solenoid, each energizing circuit means including a limit switch controlled by the position of the opposite guide rollers.

4. The monorail track and car combination of claim 3, and means to at times independently activate one of said energizing circuit means.

5. The monorail track and car combination of claim 1, and wherein the means to simultaneously raise said one roller and lower the other roller comprises respective solenoids operatively-connected to the rollers and respective energizing circuit means connected to the solenoids, and wherein the means to lock said one roller in raised position includes a limit switch controlled by the position of said opposite guide roller.

6. The monorail track and car combination of claim 5, and an externally-controlled switch having a set of contacts connected in parallel with said limit switch.

7. The monorail track and car combination of claim 6, and wherein said externally-controlled switch has an additional set of contacts connected in series with the solenoid energizing circuit means associated with said opposite guide roller.

8. The monorail track and car combination of claim 7, and wherein said solenoid energizing circuit means associated with the opposite guide roller includes a limit switch controlled by the position of said one guide roller.

9. The monorail and track and car combination of claim 5, and an alarm device provided with an energizing circuit including two further limit switches connected in series and respectively controlled by the positions of the right and left guide rollers so as to be simultaneously closed when the right and left guide rollers are in like positions.

10. The monorail track and car combination of claim 9, and wherein said further limit switches are closed when the guide rollers are in raised positions.

References Cited

UNITED STATES PATENTS

| | | |
|---|---|---|
| 1,691,296 | 11/1928 | Litvinchev. |
| 1,697,922 | 1/1929 | Lancellotte. |
| 3,017,838 | 1/1962 | Bingham. |
| 3,098,454 | 7/1963 | Maestrelli. |

ARTHUR L. LA POINT, *Primary Examiner.*

R. A. BERTSCH, *Assistant Examiner.*